United States Patent Office 2,970,912
Patented Feb. 7, 1961

2,970,912
SPENT CATALYST TREATMENT AND PRODUCT

Albert J. Gehrt and M. Douglas Knapheide, Quincy, Ill., assignors to Moorman Manufacturing Company, Quincy, Ill., a corporation of Illinois No Drawing. Filed Dec. 31, 1958, Ser. No. 784,049

11 Claims. (Cl. 99—2)

This invention relates, generally, to a process for treating spent solid phosphoric acid catalysts so as substantially to increase the nutritional availability of the phosphate content thereof. More specifically, the invention relates to a process or method of treating spent solid phosphoric acid catalysts, of the type used in polymerizing olefins to produce high octane motor fuel components and various petro-chemicals, so as substantially to increase the nutritional availability of the phosphate content thereof and yield a product valuable for use in animal feeds as a source of phosphorus.

These catalysts gradually lose their efficiency after prolonged use, whereupon they may be either discarded or regenerated several times before discard, depending upon the practice at the local refinery. In either case, when discarded, the catalyst is referred to herein as, and is considered to be "spent" catalyst.

In the petroleum industry a number of refineries use solid phosphoric acid catalysts to polymerize olefins and produce high octane motor fuel components and various petro-chemicals. Such a catalyst consists essentially of pyrophosphoric acid and a siliceous sorbent carrier therefor, usually in the proportions of about 80% by weight of the acid to about 20% by weight of the carrier.

Such a catalyst may be prepared by mixing approximately 80% by weight of commercial orthophosphoric acid with about 20% by weight of a siliceous material such as kieselguhr. The mix is then heated to approximately 400° F. at which temperature it solidifies. The solid cake is sized to produce 4–30 mesh particles or pellets which are heated to 850–950° F., followed by steam treatment. The major portion of the phosphorus in the final catalyst is in the form of pyrophosphoric acid.

Various soliceous materials may be used as carriers such as diatomaceous earth, kieselguhr, artificially prepared porous silica, e.g., Sil-O-Cel, fuller's earths and clays such as bentonite, montmorillonite, and certain artifically prepared aluminum silicates such as Tonsil.

Solid phosphoric acid catalyst of the type to which the present invention relates is described in detail in Ipatieff and Schaad Patent 2,120,702 dated June 14, 1938. In that patent a detailed method of preparing the catalysts is described with a number of variations, and the use of the catalysts in the petroleum refining art is also described. The patent points out the manner in which a catalyst may be regenerated until it is not susceptible of further regeneration in an efficient manner.

When freshly prepared, the solid phosphoric acid catalysts are usually in the form of pellets or granules through bodies of which gases or fluids may easily pass. For example, bodies of the catalyst may be supported in suitable receptacles such as tubes so that the gases or vapors to be treated may be passed therethrough. In a refinery which regenerates its catalyst, when a body of the catalyst can no longer be regenerated to a satisfactory level of activity, which condition is usually accompanied by considerable powdering, it is removed from the reactors in a suitable manner such as by drilling out or by forcing it out by steam. The removed spent catalyst is usually in the form of a dark gray to black powder which may include considerable quantities of pellets of a size in the order of one-quarter of an inch.

Spent catalyst will usually contain from 24 to 27% of elemental phosphorus. Chemical (0.4% HCl) and biological (Chick) availability tests indicate that the phosphate in the spent catalyst is only 25 to 30% available. The moisture content of the spent catalyst will usually run from 6 to 12%. There may be some variation in the spent catalysts coming from different refineries due to differences in method of preparation, use, or regeneration. However, all samples of spent catalyst which have been tested have proved susceptible to being treated in accordance with the method of the present invention, so as substantially to increase the nutritional availability of the phosphate content.

While the solid phosphoric acid catalysts have been used commercially for over twenty years, disposal of the spent catalysts has constituted and remained a problem. They are strongly acidic waste materials and therefore corrosive. Thus, the spent catalysts are difficult to handle or store, especially when they become wet or damp. They cannot be burned. To a limited extent the spent catalysts have been used as fertilizer, but no substantial demand exists for this use. Hence, the practice has been to dump the spent catalysts, but even dumping is usually a problem. In view of the strongly acidic nature of the spent catalysts, when dumped, they often constitute a hazard or threat to health and property as a result of stream, well or water supply pollution.

However, as a result of the present invention, these spent solid phosphoric acid catalysts which heretofore have been worthless and difficult to dispose of, may now be economically converted to a source of phosphate equal to the highest class of feed grade phosphates.

Various efforts were made by us to treat the spent catalyst so as to increase the availability of the phosphate content before the method of the present invention was discovered. A number of procedures were tried which did not prove successful for one reason or another. For example, since the spent catalyst is extremely acidic it was thought that neutralization of the acid with lime might increase the phosphate availability. Dry heating of the spent catalyst without and with lime (CaO) was tried but this did not increase the availability, and actually decreased it at higher temperatures.

Another procedure tried was to steam the spent catalyst under pressure, e.g. 100 p.s.i. This was found to be reasonably effective from the standpoint of increasing the phosphate availability. However, the mechanical difficulties of applying steam under pressure and removing the moist product from the retort or pressure chamber, presented problems and difficulties, and would require expensive processing equipment, especially if carried out on a large scale.

Still another experimental procedure involved mixing with the spent catalyst approximately four times the quantity of water theoretically required for hydration of the pyrophosphoric acid to orthophosphoric acid. These mixtures, which were mealy but not really wet, were placed in closed containers and heated overnight in an oven at 100° F. Availability tests indicated very little increase in the phosphate availability of the product.

Finally, a very satisfactory procedure for treating the spent catalyst to increase substantially the availability of the phosphate content was discovered in accordance with the present invention. This procedure involves treating the spent catalyst with quick lime (CaO) in cool or cold water while depending upon the heats of hydration of the lime and the pyrophosphoric acid, plus the heat of neutralization of the orthophosphoric acid, to drive the resulting exothermic reaction to completion.

The object of the invention, generally stated, is an economical, convenient, and uncomplicated procedure for treating spent solid phosphoric acid catalyst so as substantially to increase the nutritional availability (e.g. from 25–30% up to 90–95%) of the phosphate content and yield a product economically and nutritionally valuable for use in animal feeds.

One object of the invention was the provision of such a benefaction treatment of spent solid phosphoric acid catalyst which does not require expensive or special equipment.

Another object of the invention is the provision of a benefaction treatment of spent solid phosphoric acid catalysts which requires only cheap or inexpensive materials (e.g. water and quick lime), and does not require external heating.

Another object of the invention is a method of treating spent solid phosphoric acid catalysts which may be readily applied to spent catalysts coming from various refineries throughout the country.

Another object of the invention is the provision of a new and inexpensive feed ingredient constituting an excellent nutritional source of phosphate or phosphorus.

Still another object is the provision of new feeds containing such new and improved feed ingredient as the source of phosphate or phosphorus.

Certain other objects of the invention will, in part, be obvious and will in part appear hereinafter.

For a more complete understanding of the nature and scope of the invention, reference may now be had to the following detailed description thereof.

*Example 1*

300 pounds of cool or cold water are introduced into the rotating mixing hopper or drum of a conventional two-bag concrete mixer. 100 pounds of coarsely pulverized lime (CaO) and 200 pounds of spent phosphoric acid catalyst are introduced into the rotating hopper. A slurry promptly forms and after approximately one minute the hopper is discharged while rotating. The slurry commences to run out from the hopper as a thin watery mass but within the minute or so that is required to empty the hopper it begins to set up so that the final portion has begun to thicken. The reaction evidently starts as soon as the slurry is formed in the hopper and within a matter of a minute or two (depending upon the temperature of the water, the temperature of the equipment, and the outside temperature) the reaction mass may be emptied into a wooden bin in which it sets up into a semi-dry mass similar to cake frosting as soon as it has discharged. The exothermic reaction initiated in the mixer continues and steam is given off for a period of several hours. Once the concrete mixer gets warmed up a complete batch can be run through in approximately three minutes. This includes introducing the water into the rotating barrel or hopper, introducing the lime and spent catalyst, mixing for approximately one minute, and then discharging the reaction mass. Immediately after discharge the product will contain approximately 40% moisture and is in the form of a very mealy solid. When dried to a moisture content of 15–20% the product appears thoroughly dry and powdery.

The reaction mass is allowed to remain in the bins at elevated temperatures for say twelve to twenty-four hours to achieve maximum availability.

The phosphate content in the final product is primarily dicalcium phosphate, this being considered the preferred form for use in animal feeds. This content may be varied between mono and tri calcium phosphates by decreasing or increasing, respectively, the proportion of lime to spent catalyst.

As a result of experimentation and test runs the following facts were established with respect to the process of the invention: the preferred proportions of reactants are 3 parts water, 1 part lime, and 2 parts spent catalyst; the quantity of water may be regulated to minimize the need for drying the product; mixtures of quick lime and spent catalyst will react in the presence of the moisture in the air if left standing; the phosphorus is available in approximately the same amount in the fresh and spent catalyst and the treatment of the present invention increases the availability to approximately the same extent; the process is non-corrosive and may be carried out in iron or steel; the treated product should stand at elevated temperature for several hours after processing; and, for maximum product uniformity the spent catalyst is ground before and after processing.

If desired, the process may be carried out in a continuous manner.

The following typical feed formulations will serve to illustrate the use of the benefacted or treated spent solid phosphoric acid catalysts processed according to the method of this invention.

TABLE 1

| All-Mash Laying Feed | Lbs. | Pig Starter Feed | Lbs. | Beef Cattle Feed | Lbs. |
|---|---|---|---|---|---|
| Ground yellow corn | 600 | Ground yellow corn | 900 | Ground ear corn | 400 |
| Ground barley or oats | 600 | Wheat Middlings | 200 | Molasses | 200 |
| Wheat bran | 250 | Distillers grain solubles | 125 | Oat mill feed | 200 |
| Distillers grains with solubles | 200 | Dehydrated alfalfa | 100 | Screenings | 400 |
| Dehydrated alfalfa | 50 | Soybean oil meal | 300 | Distillers grains with solubles | 300 |
| Soybean oil meal | 100 | Tankage | 200 | Alfalfa meal | 150 |
| Meat scrap | 60 | Fish meal | 125 | Linseed meal | 100 |
| Iodized salt | 10 | Iodized salt | 10 | Cottonseed meal | 200 |
| Ground limestone | 80 | Ground limestone | 20 | Iodized salt | 20 |
| Treated spent catalyst | 45 | Treated spent Catalyst | 20 | Ground limestone | 30 |
| Manganese sulfate | 0.25 | | | Treated spent catalyst | 25 |
| Vit. A and D Oil (400–2,000) | 5.0 | | | Cobalt sulfate | 2 grams |
| Total | 2,000.25 | | 2,000 | | 2,025 |

Having fully described the invention, what is claimed as new is:

1. The method of treating a solid catalyst consisting predominantly of pyrophosphoric acid and a siliceous sorbent carrier therefor to substantially increase the availability of the phosphate content thereof which comprises treating the catalyst with quicklime in the presence of water.

2. The method of treating a spent solid catalyst consisting predominantly of pyrophosphoric acid and a siliceous sorbent carrier therefor to substantially increase the availability of the phosphate content thereof to at least about 90 percent which comprises reacting the spent catalyst in the presence of water with sufficient quicklime to convert phosphoric acid content mostly to dicalcium phosphate.

3. The method of processing spent solid phosphoric acid catalyst consisting essentially of a major amount of pyrophosphoric acid and a minor amount of a siliceous sorbent carrier therefor so as to substantially increase availability of the phosphate content which comprises introducing said spent catalyst and quicklime into water and mixing the resulting slurry of the three materials together until the same begins to thicken, and thereafter maintaining the reaction mixture at elevated temperature for several hours until the increase in phosphate availability is substantially complete, the amount of quicklime added being sufficient to convert the phosphate content in the spent catalyst primarily into dicalcium phosphate, and the amount of water being sufficient to yield initially said thin slurry of the spent catalyst and quicklime and not more than enough to exceed about 40% by weight of the reaction mass immediately after the initial reaction occurs.

4. The method of processing spent solid phosphoric acid catalyst having a phosphate availability of about 25% to 30% which comprises mixing for approximately one minute approximately 2 parts by weight of the spent catalyst and approximately 1 part by weight of quicklime in approximately 3 parts of cool to cold water contained in a rotating hopper, discharging the resulting slurry into a receptacle, and retaining the same therein at elevated temperature until the phosphate availability has increased to at least about 90 percent.

5. The method of processing a solid phosphoric acid catalyst comprising approximately 80 percent by weight of orthophosphoric acid and about 20 percent by weight of a siliceous sorbent therefor so as to substantially increase the availability of the phosphate content, which comprises mixing approximately 2 parts by weight of spent catalyst, approximately 1 part of lime and approximately 3 parts of cool to cold water, discharging the fluid reaction mass into a receptacle and holding the same therein at elevated temperature until the increase in phosphate availability is substantially complete.

6. The product resulting from the process of claim 1.
7. The product resulting from the process of claim 2.
8. The product resulting from the process of claim 3.
9. The product resulting from the process of claim 4.
10. The product resulting from the process of claim 5.
11. A mixed feed containing the product of claim 1 as the primary source of phosphorus therein.

References Cited in the file of this patent
UNITED STATES PATENTS
2,759,795    Archer _____ Aug. 21, 1956